United States Patent [19]
Taylor, Sr.

[11] Patent Number: 5,424,904
[45] Date of Patent: Jun. 13, 1995

[54] CIRCUIT FOR ELECTRICALLY CONTROLLED INTERMITTENT MOTION

[76] Inventor: Thomas T. Taylor, Sr., 6622 W. 87th St., Los Angeles, Calif. 90045

[21] Appl. No.: 130,717

[22] Filed: Oct. 4, 1993

[51] Int. Cl.6 .................................. H01H 47/00
[52] U.S. Cl. ...................... 361/195; 307/132 EA; 307/141; 361/160
[58] Field of Search ............. 361/139, 143, 160, 166, 361/170, 189, 191, 194, 195, 206, 210; 307/113, 132 R, 132 E, 132 EA, 132 M, 141, 141.4, 141.8

[56] References Cited
U.S. PATENT DOCUMENTS

| | | | |
|---|---|---|---|
| 3,976,921 | 8/1976 | Pearlman | 361/160 |
| 4,133,020 | 1/1979 | MacLean | 361/156 |
| 4,912,376 | 3/1990 | Strick | 307/141 |

*Primary Examiner*—Jeffrey A. Gaffin
*Attorney, Agent, or Firm*—John Joseph Hall

[57] ABSTRACT

A circuit for electrically controlled intermittent motion having a time-delay relay and an all-purpose double-pole-double-throw relay for use in conjunction with a gear-head motor having an output shaft, which, upon application to the circuit of a triggering signal either momentary or prolonged for several minutes, rotates approximately 360° and stops.

3 Claims, 2 Drawing Sheets

CIRCUIT FOR ELECTRICALLY CONTROLLED INTERMITTENT MOTION

BACKGROUND OF THE INVENTION

1. Field of the Invention

The present invention relates to an electrical circuit for use in conjunction with a gear-head motor which is arranged so that, upon applying a triggering signal, the output shaft of the motor rotates through 360 degrees and then stops. If some fraction of a 360 degree rotation is required, this may be achieved by annexing one or more stages of reduction gearing to the output shaft of the motor. The circuit has the capability of accepting either a momentary or a prolonged trigger signal lasting several minutes. Either type of signal may be applied by manual or by mechanical means.

2. Description of the Prior Art

Applicant is unaware of prior art devices having the construction or capability of use of applicant's invention.

SUMMARY OF THE INVENTION

The present invention provides an electrical circuit having two relays and a gear-head motor, all powered by a standard 120 volt, 60 hertz source of electricity.

The relays are of two types, a time-delay relay which has a coil adapted to 120 volts, 60 hertz and an all-purpose double-pole-double-throw relay which also has a coil adapted to 120 volts 60 hertz.

The triggering signal must be applied at a point in the circuit appropriate to the nature of the signal. Thus, if the signal is momentary, it must be applied at a point where it will be fed directly into the all-purpose relay. If the signal is prolonged, it must be applied at a point where it will go first into the time-delay relay. The latter has a control knob on its top which can be preset to make the relay deliver an output signal lasting anywhere from 0.05 second to 2 seconds. A setting of 1 second has been found to be satisfactory. This output signal from the time-delay relay simulates the momentary trigger signal alluded to above and, as such, is fed into the all-purpose relay by the configuration of the circuit.

The motor shaft begins to rotate as soon as the all-purpose relay is energized and it stops when a rotor on said shaft opens a normally-closed switch.

The circuit is provided with capacitor means to prevent arcing within the all-purpose relay.

It is, therefore, an object of this invention to provide a circuit having the capability of producing electrically controlled intermittent motion by trigger signal means.

Another object of this invention is to provide an electrical circuit that can produce intermittent motion by accepting a prolonged trigger signal, produced either manually or by mechanical means.

A further object of this invention is to provide an electrical circuit that can produce intermittent motion by accepting a momentary trigger signal produced either manually or by mechanical means.

A yet further object of this invention is to provide a circuit having the capability of producing electrically controlled intermittent motion by trigger signal means using conventional parts and components.

These and other objects will be more readily understood by reference to the following detailed description and claims, taken in conjunction with the accompanying drawings.

DESCRIPTION OF A PREFERRED EMBODIMENT

Figure 1:
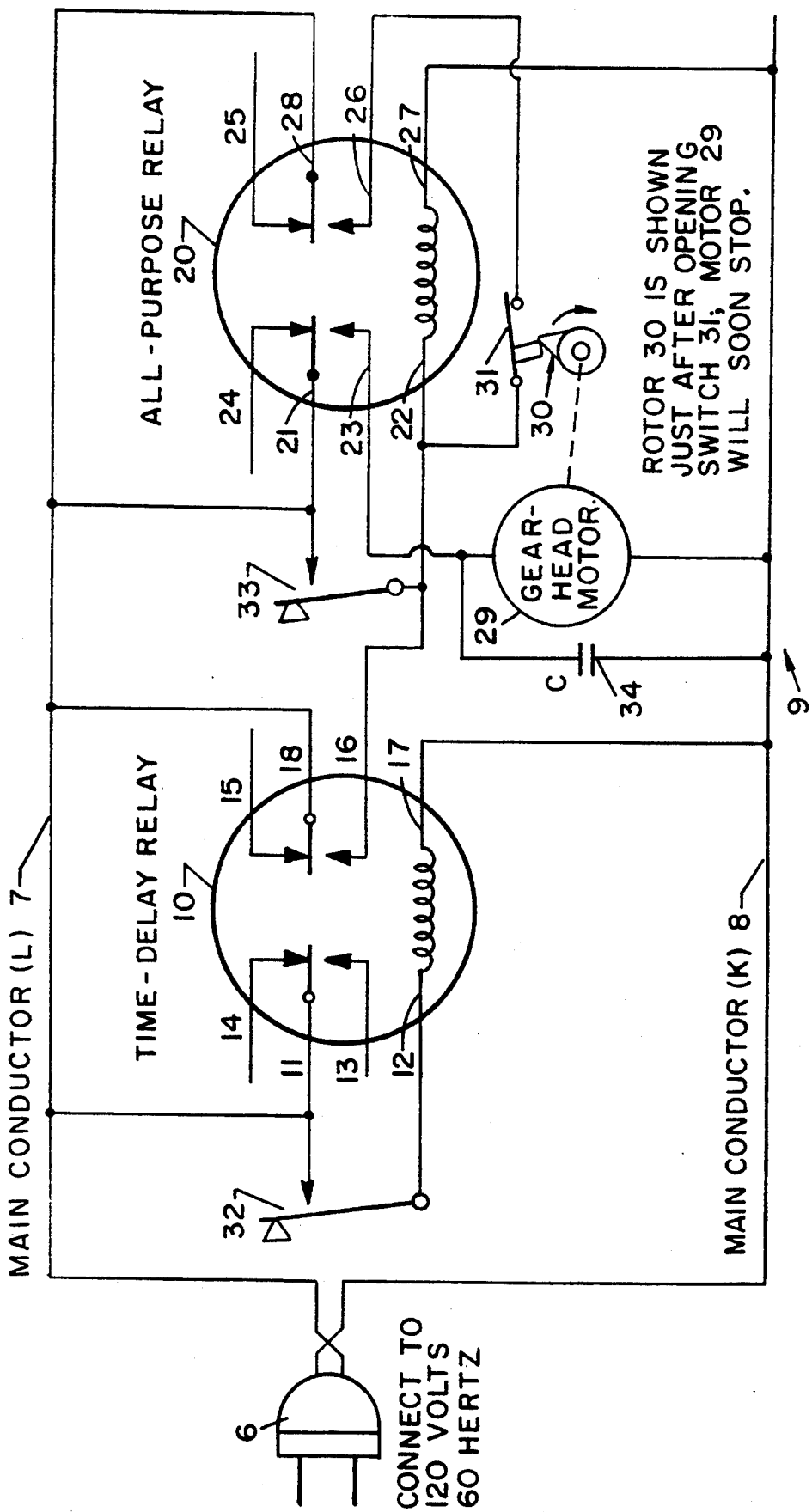
FIG. 1 is a schematic drawing of the preferred embodiment of the present invention.

FIG. 1 is a schematic drawing illustrating the arrangement and various components of circuit 9. Circuit 9 receives power through plug 6 from a standard 120 volt, 60 hertz power source (not shown). The voltage so supplied appears between main conductor (K) 8 and main conductor (L)7. Any time a conducting path between these two conductors is provided, current will flow. The two large circles represent the two relays used in the circuit. Each relay has eight terminals and every terminal provides a connection to one of the internal parts of the relay. There is an established convention for affixing a characteristic number to each of these terminals.

For example, the two ends of the coil are numbered 2 and 7. For relays which plug into octal sockets, such as these do, the characteristic numbers match the numbers stamped onto the octal sockets. The general numbering system used in FIG. 1 conforms to the convention alluded to above by incorporating the characteristic number as the second digit of the two digit numeral assigned to each relay terminal.

Figure 2:
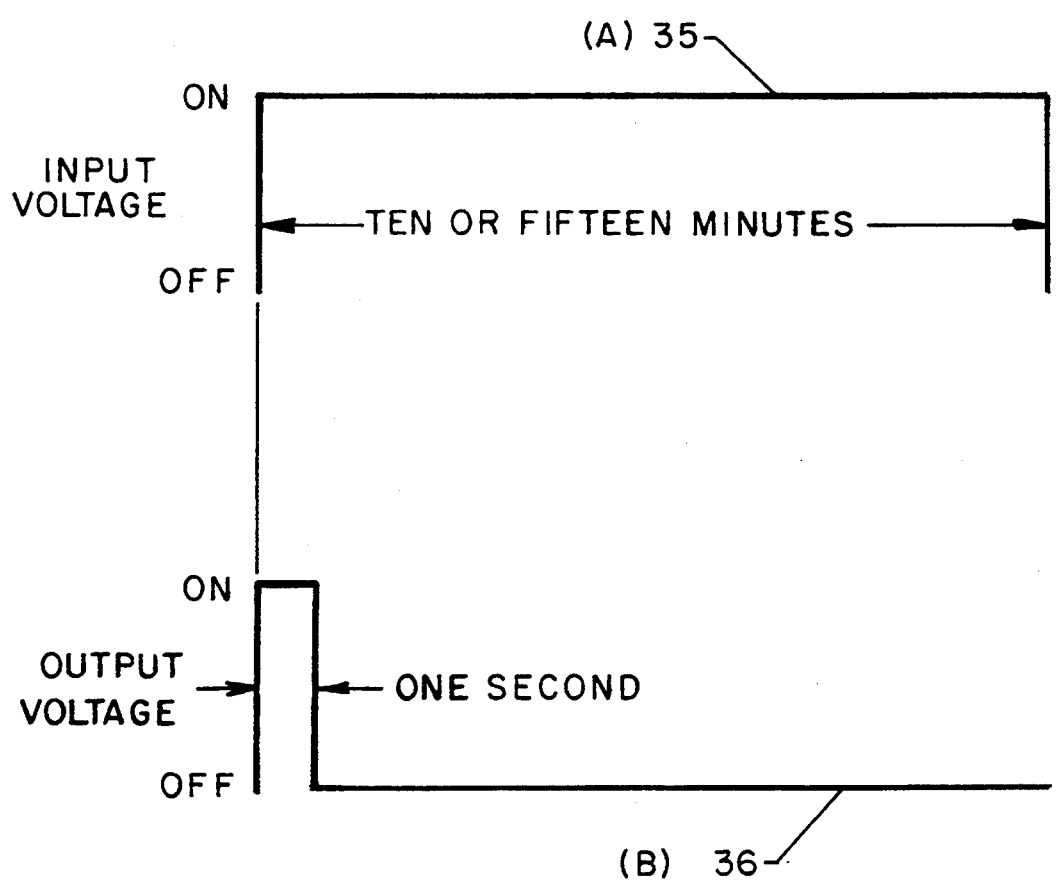
FIG. 2 is a drawing illustrating the action of the time delay realy of the present invention.

FIG. 2 is a drawing illustrating the action of the time-delay relay.

A prolonged trigger signal may be applied to the time-delay relay 10 by closing switch 32, thereby applying voltage to the input terminals 12 and 17. A suitable relay 10 is a model S 1 time-delay relay manufactured by the National Controls Corporation. Other models of time-delay relays may be used provided they have capability of operation equal to model S 1. The prolonged trigger signal may be applied at the location of switch 32 by suitable means to produce the same effect as closing switch 32. In the event of a prolonged trigger signal having a duration ranging from 10 to 15 minutes, the action of relay 10 is illustrated in FIG. 2.

The heavy line (A) 35 represents the voltage applied to the input terminals 12 and 17 of relay 10. The heavy line (B) 36 represents the output voltage which appears between terminal 16 and main conductor (K) 8. This output voltage is applied to the input terminals 22 and 27 of all-purpose relay 20.

Relay 20 may be any standard all-purpose double-pole-double-throw relay with a 120 volt, 60 hertz coil.

The duration of the output voltage from relay 10 can be preset by adjusting a knob (not shown) on top of said relay. A time that is preset at one second will enable relay 10 to produce the same effect as closing switch 33 for one second and then re-opening it.

When relay 20 receives its momentary trigger signal from either the action of relay 10 or the manipulation of switch 33 as described above, leaves 21 and 28 will transfer to the lower contacts 23 and 26, respectively.

The most crucial single feature of the circuit is the wire connecting terminal 26, through normally-closed switch 31, back to terminal 22. This wire and switch are collectively called the "sustaining connection." The process whereby relay 20 has become energized has just been explained.

Current now flows out of terminal 26, through the sustaining connection, and through the coil of relay 20—maintaining the latter in an energized state. This state will persist as long as the sustaining connection is intact. While relay 20 is thus energized, current flows out of terminal 23 and through gear-head motor 29, causing the output shaft of the latter to rotate.

When 360 degrees of rotation nears completion, rotor 30, which is mounted on said output shaft, opens switch 31. This breaks the sustaining connection and causes relay 20 to become de-energized, allowing leaves 21 and 28 to return to their normal positions on contacts 24 and 25, respectively. Motor 29 coasts for approximately $\frac{1}{2}$ second and then stops, having been deprived of current. Since motor 29 is a gear-head motor, a considerable amount of reduction gearing is built into it, interposed between its armature and its output shaft. Thus, although the armature may make one or two revolutions during the coasting period, the output shaft will probably move only 45 or 50 degrees. In engineering applications, the stopping point is not to be considered as the point at which switch 31 opens, but rather the point at which the output shaft stops after coasting.

Rotor 30 has moved out of the way of switch 31 by the end of coasting, i.e., by the time motor 29 actually stops. This permits switch 31 to re-close and makes circuit 9 ready for a new cycle of operation.

Circuit 9 employs capacitor (C) 34 in parallel with motor 29. Capacitor 34 should have a value of about $\frac{1}{2}$ microfarad and a D.C. voltage rating of about 650 volts; its function is to suppress the short pulse of high voltage generated by the sudden interruption of current through the inductive winding of motor 29. If not suppressed in this way, said voltage pulse would cause arcing between contacts 21 and 23 inside relay 20, eventually burning these contacts. Because the circuit operates at the relatively low frequency of 60 hertz, the presence of capacitor 34 has no adverse effects.

Although I have described my invention in detail with reference to a preferred embodiment, it is understood that various modifications may be made in the construction and arrangement of component parts without departing from the spirit and scope of the invention as hereinafter claimed.

I claim:

1. An electrically powered circuit for electrically controlled intermittent motion, comprising:

an all-purpose double-pole-double-throw relay with a coil and connected to conductor lines and having output terminals producing an output voltage when said relay is energized by a momentary trigger signal; an external conducting path means for applying voltage from one of said terminals through said coil of said relay and through a normally closed switch to maintain said relay in an energized state while said switch is closed;

a gear-head motor connected between one of said conductor lines and one of said terminals of said relay and having an output shaft with means engageable with said switch upon rotation of said shaft, said shaft rotating with revolution of said motor when electric current flows through said motor upon energization of said relay by said trigger signal, said means engaging and opening said switch to stop said motor and to de-energize said relay when said motor has completed approximately one revolution; and capacitor means connected to said gear-head motor to prevent arcing within said relay.

2. An electrically powered circuit for electrically controlled intermittent motion according to claim 1, in which said circuit is provided with a time-delay relay to receive a prolonged trigger signal and convert said signal into a momentary trigger signal for energizing said all-purpose double-pole-double-throw relay and adapting said circuit to a prolonged trigger signal.

3. An electrically powered circuit for electrically controlled intermittent motion according to claim 1, in which said capacitor means is connected in parallel with said gear-head motor.

* * * * *